May 30, 1950     R. THORNTON     2,509,946
LIVESTOCK FEED GRINDER AND FEEDING MACHINE
Filed Nov. 8, 1945     2 Sheets-Sheet 1
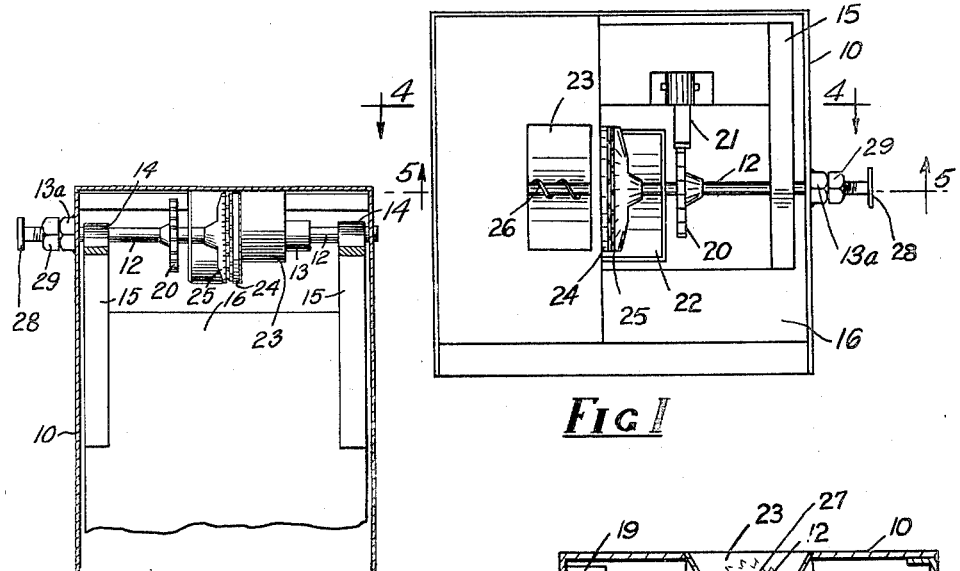
Fig. 1
Fig. 4
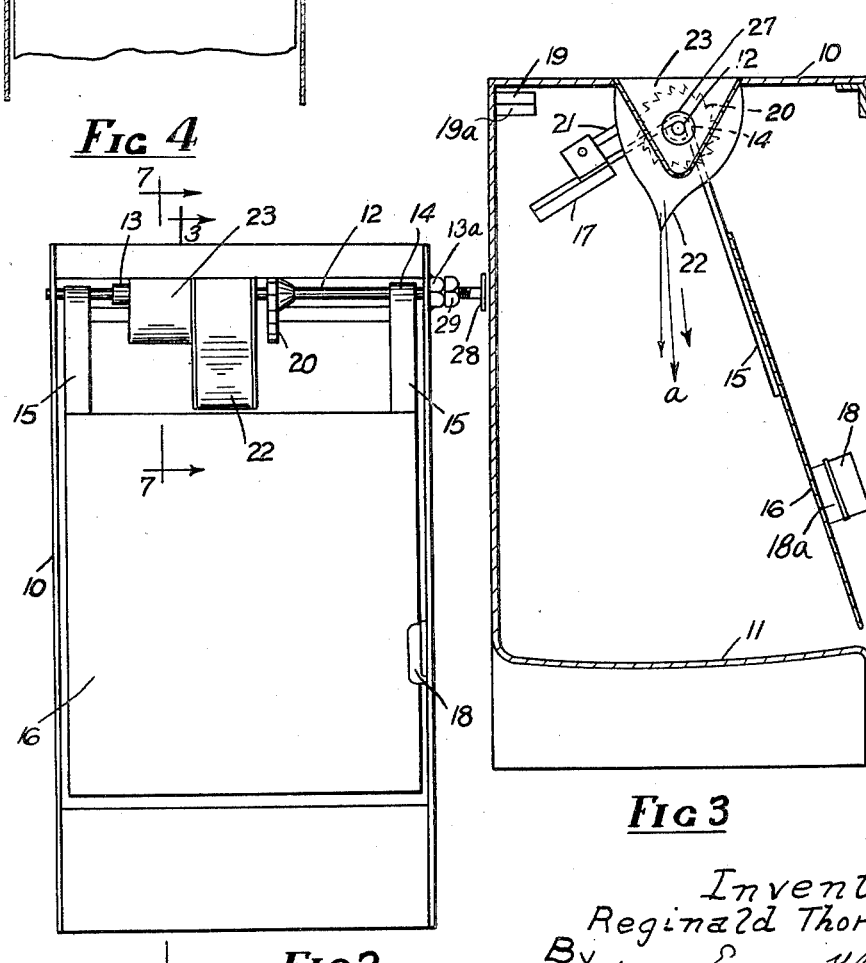
Fig. 2
Fig. 3
Inventor,
Reginald Thornton
By Young, Emery & Thompson
Attys.

May 30, 1950      R. THORNTON      2,509,946
LIVESTOCK FEED GRINDER AND FEEDING MACHINE
Filed Nov. 8, 1945      2 Sheets-Sheet 2
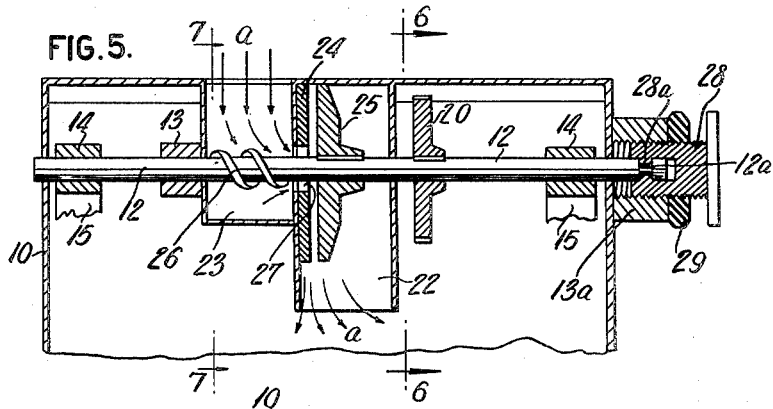
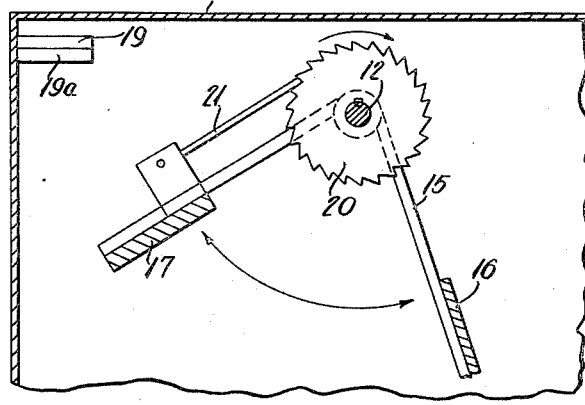
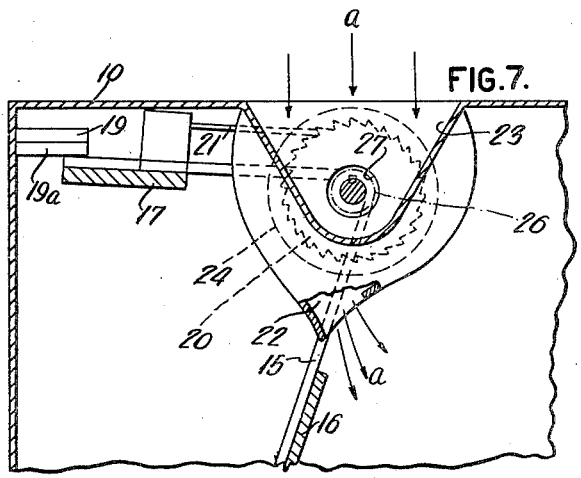
Inventor
Reginald Thornton
By Young, Emery & Thompson
Attys.

Patented May 30, 1950

2,509,946

UNITED STATES PATENT OFFICE 2,509,946

LIVESTOCK FEED GRINDER AND FEEDING MACHINE

Reginald Thornton, Kyogle, New South Wales, Australia

Application November 8, 1945, Serial No. 627,509
In Australia April 3, 1945

5 Claims. (Cl. 241—245)

This invention relates to stock feeders of the type in which the animal to be fed operates the feeder by pushing against a pivoted flap door operatively connected to a feed discharge means. In such case, it is usual to arrange that the feed is discharged in predetermined amounts on to a floor, trough or bin from which the animal eats the feed.

One object of my invention is to provide means of a simple and effective nature for grinding the feed before discharge to livestock such as pigs, cattle, horses and sheep, said means being incorporated in a stock feeder of the above type.

A further object of my invention is to provide an adjustment of the grinding means whereby the feed which may be in granular form such as grain, may be coarsely or finely ground before discharge.

The nature of the invention will be fully understood from the following description taken in connection with the accompanying drawings wherein:

Figures 1 and 2 are respectively a plan and an elevation of apparatus embodying the invention with the cover plate and main supply hopper removed.

Figure 3 is a section on the line 3—3 of Figure 2, and

Figure 4 is a part section on the line 4—4 of Figure 1. Fig. 5 is a fragmentary longitudinal cross-section on the line 5—5 in Fig. 1 with the grinding discs spaced apart. Fig. 6 is a fragmentary vertical cross-section on the line 6—6 in Fig. 5 with the flap-door in the lowered position. Fig. 7 is an enlarged fragmentary vertical cross-section on the line 7—7 in Fig. 2 with the flap-door in the fully raised position.

According to the form of the invention illustrated, a box 10 is erected, being open at the front and having a removable cover plate and main supply hopper, (these elements are not shown in the drawings), fitted on the top of the box 10. The floor 11, which may be a plate of steel or other suitable material, is arcuate in vertical cross section. A shaft 12 is mounted transversely in bearings 13 and 13a at the upper end of the box 10 directly above the centre line of the floor 11, and has rotatably secured upon it the bent sections 14 of plates 15, the longer sections of said plates 15 normally extending down towards the floor 11 at the front. These plates 15 have secured to them a flap door 16 with a clearance space between the flap door and the side walls and between the flap door and the floor of the box. The shorter sections of said plates 15 extend downwardly towards the rear and have a counterweight 17 secured to their ends, so that normally the lower end of the flap door 16 is towards the front of the floor 11, and rests against a stop 18. 19 is another stop at the upper rear.

A ratchet wheel 20 is secured to said shaft 12 and a pawl 21 on the upper side of said counterweight engages wheel 20 so that when an animal pushes the flap door 16 to the rear of the floor 11 the said shaft 12 will be partially rotated. This partial rotation may be availed of for delivering predetermined quantities of food into a chute 22 (for example) which directs the food on to the floor 11. The food is thus only accessible to the animal after each radial movement of the flap door 16. In practice it has been found that animals, particularly pigs, quickly understand that the swinging of the flap door 16 delivers food, which is available to them only when the flap door 16 is towards the rear.

The food to be ground or bruised, which may be grain such as wheat and maize, is supplied directly from the main supply hopper to a subsidiary hopper 23 mounted in the upper portion of the box 10. Th subsidiary hopper 23 is located between one of the plates 15 and the chute 22. The said shaft 12 passes through this subsidiary hopper 23 and axially through a fixed grinding disc 24 outside the hopper 23. Another parallel grinding disc 25 is secured to the shaft 12 a short predetermined distance from the fixed disc 24. The shaft 12 has upon it a worm 26 which feeds the grain from the subsidiary hopper 23 into the space between the discs 24 and 25, through an annular space 27 between the fixed disc 24 and the shaft 12. The discs 24 and 25 may be roughened, toothed or otherwise fashioned on their opposed faces to give a grinding, bruising, or the like effect, when the disc 25 upon the shaft 12 is partially rotated by the ratchet 20 and pawl 21 actuated by the swinging of the flap door 16. The hopper 23 has its bottom so designed that only the ground grains leave from between the discs 24 and 25 and fall upon the chute 22 and from thence are directed on to the floor 11. The direction of travel of the food through the machine is indicated on the drawings by the arrows $a$.

Means for adjusting the distance between the two discs 24 and 25 to suit different sized types of grain may be provided; for example, the bearing 13a is affixed to the outside of the box 10 and has an internally screw-threaded passage way in it. An externally screw-threaded adjusting screw 28 is threaded in said passage way. The end of shaft 12 is received in an axial hole in the screw 28 and engages therewith. For example, shaft 12 has an annular groove 12a engaged by an internal collar 28a in screw 28, which is screwed in or out to give lesser or greater distance between the opposed faces of discs 24 and 25. Screws 28 can be provided with a lock nut 29.

In use the grain fed from the main supply hopper is held in the subsidiary hopper 23 and normally the flap door 16 is towards the front of the box 10 against stop 18. When an animal pushes the flap door 16 towards the rear, the pawl 21 partially rotates the ratchet 20 and with it the shaft 12 and disc 25 attached to shaft 12. Some of the grain between the discs 24 and 25 is ground and falls on to the chute 22 to be delivered to the floor 11. This crushed grain is eaten by the animal which quickly learns that by allowing the flap door 16 to resume its normal attitude and to then again push it, another portion of crushed grain will become available. By these means the grain is delivered at intervals and cannot be bolted by an animal as heretofore. There will be considerable saving of food and quicker fattening and conditioning.

Although the discs 24 and 25 are shown in the preferred location in the drawings it will be understood that they may be at other positions with means for delivering the grain crushed by them to the rear of flap door 16. For example, the discs 24 and 25 could be on the outside of box 10 with the ratchet 20 and pawl 21 within the box.

I claim:

1. An improved livestock feed grinder and feeding machine consisting of a box open at its front and having side walls and a stationary rectilinear food trough, a transverse shaft located above the centre of said trough, a flap rotatably mounted at its upper end upon said shaft, the edges of said flap being closely adjacent the side walls and trough of said box, a counterweight secured to the flap and serving to yieldingly hold the lower edge of said flap normally in position at the front of the box, a rearward extension of said flap, and a pawl carried by said extension, a ratchet wheel fixedly mounted upon the shaft and co-acting with said pawl so as to drive the shaft when driven by flap and pawl movement, a supply hopper surrounding the shaft, means secured to the shaft adjacent the hopper for grinding the feed, means on the shaft for delivering food in predetermined quantities from the hopper to the grinding means when the flap is pushed away from the normal position, and a chute surrounding the grinding means for directing the crushed feed to the food trough.

2. An improved livestock feed grinder and feeding machine consisting of a box open at its front and having side walls and a stationary rectilinear food trough, a transverse shaft located above the centre of said trough, a flap rotatably mounted at its upper end upon said shaft, the edges of said flap being closely adjacent the side walls and trough of said box, a counterweight secured to the flap and serving to yieldingly hold the lower edge of said flap normally in position at the front of the box, a rearward extension of said flap, and a pawl carried by said extension, a ratchet wheel fixedly mounted upon the shaft and co-acting with said pawl so as to drive the shaft when driven by flap and pawl movement, a supply hopper surrounding the shaft, a stationary grinding disc surrounding the shaft and secured to the hopper, a rotary grinding disc secured to the shaft adjacent the stationary grinding disc and spaced therefrom, a passage from said hopper through the stationary grinding disc to the space between it and the rotary grinding disc, and a chute leading the material ground by the discs to the food trough.

3. An improved livestock feed grinder and feeding machine as claimed in claim 2 wherein a worm is provided on that part of the shaft within the hopper for moving grain or the like from the hopper to the space between the stationary and rotary grinding discs.

4. An improved livestock feed grinder and feeding machine as claimed in claim 2 including stop pieces secured to the box and separate from the trough for limiting forward and backward movement of said flap.

5. An improved livestock feed grinder and feeding machine as claimed in claim 2 including means for axially adjusting said shaft to give greater or lesser distance between the adjacent faces of the stationary and rotary grinding discs.

REGINALD THORNTON.

REFERENCES CITED

The following references are of record in the file of this patent:

UNITED STATES PATENTS

| Number | Name | Date |
|---|---|---|
| 186,440 | Staub | Jan. 23, 1877 |
| 496,068 | Snyder | Apr. 25, 1893 |
| 1,036,762 | Williams | Aug. 27, 1912 |
| 1,099,063 | Lauder | June 2, 1914 |
| 1,100,517 | Bogle | June 16, 1914 |
| 1,171,742 | Meyer | Feb. 15, 1916 |
| 1,226,474 | Dawson | May 15, 1917 |
| 1,358,525 | Cottrel | Nov. 9, 1920 |
| 1,390,209 | McArthur | Sept. 6, 1921 |
| 1,825,633 | McDougall | Sept. 29, 1931 |

FOREIGN PATENTS

| Number | Country | Date |
|---|---|---|
| 143,093 | Austria | Oct. 10, 1935 |
| 767,606 | France | May 1, 1934 |
| 486,626 | Germany | Nov. 21, 1929 |